United States Patent [19]

Inamoto et al.

[11] 4,261,610
[45] Apr. 14, 1981

[54] MOLDING ASSEMBLY

[75] Inventors: Hiroshi Inamoto, Yokohama; Yukio Yamane, Yokosuka, both of Japan

[73] Assignee: Nissan Motor Company, Limited, Yokohama, Japan

[21] Appl. No.: 935,854

[22] Filed: Aug. 22, 1978

[30] Foreign Application Priority Data

Aug. 24, 1977 [JP] Japan .............. 52-112239[U]

[51] Int. Cl.³ .............................................. B60J 1/06
[52] U.S. Cl. .............................. 296/84 R; 296/84 D; 296/93; 52/208
[58] Field of Search ............. 296/93, 84 R, 84 D; 52/208, 489, 400, 397

[56] References Cited

U.S. PATENT DOCUMENTS

| 2,264,176 | 11/1941 | Englehart | 52/208 |
|---|---|---|---|
| 3,155,422 | 11/1964 | Campbell | 296/93 |
| 3,241,277 | 3/1966 | Coppock | 52/208 |
| 3,338,007 | 8/1967 | Draplin | 52/400 |
| 3,373,539 | 3/1968 | Meyer | 52/208 |
| 3,403,881 | 10/1968 | Bennett | 52/397 |
| 3,731,449 | 5/1973 | Kephart | 52/631 |
| 3,994,111 | 11/1976 | Papayoti | 52/489 |

FOREIGN PATENT DOCUMENTS 893615 10/1953 Fed. Rep. of Germany .
778231 7/1957 United Kingdom .

Primary Examiner—Robert R. Song
Attorney, Agent, or Firm—Schwartz, Jeffery, Schwaab, Mack, Blumenthal & Koch

[57] ABSTRACT

A molding member is installed and supported on the outer surfaces of supporting members which are mounted on the flange portion of a backdoor of a motor vehicle and the edge portion of a window of the same which are secured to each other. Each supporting member is of E-shape defining first and second spaces therein, in which the flange portion of the backdoor is securely disposed in the first space and the edge portion of the window is securely disposed in the second space.

14 Claims, 14 Drawing Figures 4,261,610

MOLDING ASSEMBLY

This invention relates to an improvement in molding assemblies having a decorative molding member for covering the edge portions of various structures, and more particularly to an improvement in a molding assembly for covering the edge portion of a window of a backdoor body of a motor vehicle and the flange portion of the backdoor body.

The principal object of the present invention is to provide an improved molding assembly which never requires the use of screws for the purpose of securing a molding member to another structural member.

Another object of the present invention is to provide an improved molding assembly which can overcome the disadvantages of the prior art.

A still another object of the present invention is to provide an improved molding assembly for a motor vehicle, which is improved in its operation efficiency during manufacturing and in its appearance.

A further object of the present invention is to provide an improved molding assembly used for motor vehicles, by which corrosion problems are not liable to occur since screws are not used to secure a molding member to another structural member, which screws may peel off the paint coating of the motor vehicle.

A still further object of the present invention is to provide an improved molding assembly for covering the flange portion of a backdoor of a motor vehicle and the edge portion of a window of the same, which is improved in its operation efficiency during manufacturing and in its appearance, preventing corrosion of the backdoor and vehicle body caused by the fact the paint coating is peeled off.

Other subjects, features, and advantages of the present invention will be more apparent from the following description taken in conjunction with the accompanying drawings in which.

Figure 1:
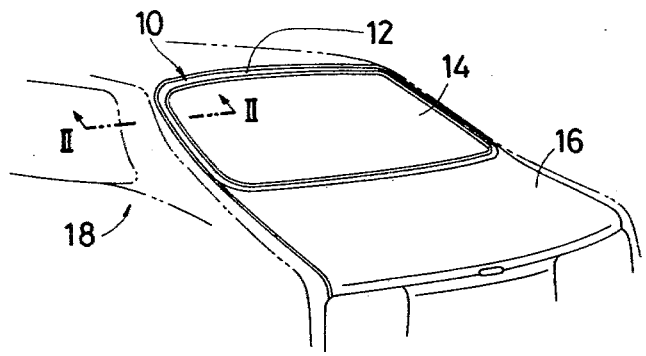
FIG. 1 is a perspective view of a portion of the body of a motor vehicle, showing a backdoor provided with a molding assembly according to the prior art.
Figure 2:
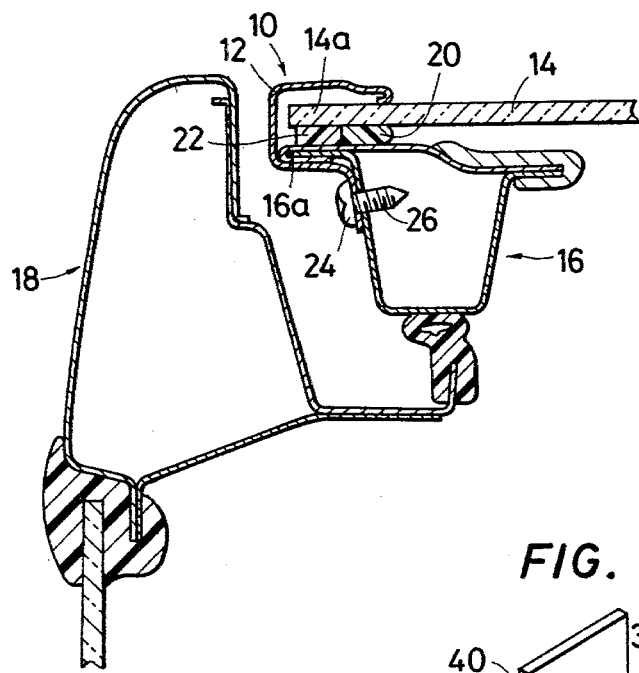
FIG. 2 is an enlarged sectional view of the prior art assembly taken generally along the plane indicated by line II—II of FIG. 1.

Referring now to FIGS. 1 and 2, there is shown a prior art molding assembly 10 having a decorative molding member 12 for covering the edge portion 14a of a window 14 or a glass of a backdoor 16 of a motor vehicle 18, which is an example of molding assemblies for various applications. As shown, the window 14 is secured to the peripheral flange portion 16a of the backdoor 16 with an adhesive 20, maintaining a space between the window 14 and the flange portion 16a by means of a spacer 22 or a space maintaining member. Accordingly, the molding 12 covers both the edge portion 14a of the window and the flange portion 16a of the backdoor 16.

With such a molding assembly 10, since the molding 12 is secured by screwing up a small screw 24 into an opening 26 formed through the wall of the backdoor 16, the following disadvantages have been, for example, encountered: (1) It is necessary to form openings for the small screws 24 at the corresponding locations of the molding 12 and the wall of the backdoor body 16. Additionally, it is troublesome to locate the above-mentioned corresponding openings and to put the small screw 24 into the corresponding openings (2) The operation of screwing the small screw 24 into the opening 26 of the backdoor body 16 may peel off the paint coating on the wall of the backdoor body 16 adjacent the opening 26. (3) Corrosion problems may be caused since water is liable to enter the inside of the backdoor 16 through the opening 26 and in the case water adheres on the portions whose paint coatings are peeled off. (4) Since the small screws 24 are exposed when the backdoor 16 is opened, the backdoor 16 of this type is not desirable from the view points of appearance and quality thereof.

In view of the above, an improved molding assembly according to the present invention is contemplated to overcome and eliminate the afore-mentioned difficulties encountered in the prior art molding assembly of the type shown in FIG. 2.

Figure 3:
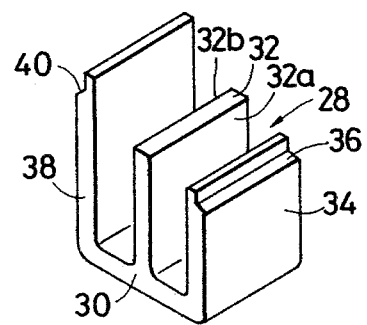
FIG. 3 is a perspective view of a supporting member forming part of a first preferred embodiment of a molding assembly in accordance with the present invention.
Figure 4:
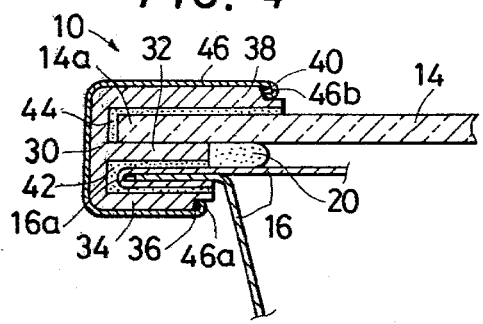
FIG. 4 is a cross-sectional view showing the assembled state of the molding assembly using the supporting member of FIG. 3.

Referring now to FIGS. 3 and 4, a first preferred embodiment of a molding assembly according to the present invention is shown, in which the same reference numerals as in FIGS. 1 and 2 are assigned to the corresponding parts and elements. As seen, the window 14 or the glass is securely mounted on the backdoor 16 adjacent its flange portion 16a by means of an adhesive material 20, maintaining a space between the window 14 and the flange portion 16a. The window 14 may be a transparent panel other than the glass.

The reference numeral 28 denotes a supporting member which is clearly shown particularly in FIG. 3. The supporting member 28 is made of rubber or plastic and is composed of a base plate portion 30 which has a certain width and a certain thickness. A central plate portion 32 is formed integrally with and substantially perpendicularly relative to the surface of the base plate portion 30. The central plate portion has a first side surface 32a and a second side surface 32b. A first side plate portion 34 is formed integrally with and sustantially perpendicularly relative to the surface of the base plate portion 30. The first side plate portion 34 is located opposite the first side surface 32a of the central plate portion 32 defining a space therebetween. As shown, the first side plate portion 34 is provided with a cutout portion 36 which is formed along the end edge portion thereof. A second side plate portion 38 is formed integrally with and substantially perpendicularly relative to the surface of the base plate portion 30. The second side plate portion 38 is located opposite the second side surface 32b of the central plate portion 32 defining a space therebetween. The second side plate portion 28 is also provided with a cutout portion 40 which is formed along the end edge portion thereof. Accordingly, the supporting member 28 is generally formed into an E-shape. As indicated in FIG. 4, the supporting member 28 is so disposed that the flange portion 16a of the backdoor 16 is received in the space between the first side plate portion 34 and the central plate portion 32, and the window 14 is received in the space between the second side plate portion 38 and the central plate portion 32. Additionally, the flange portion 16a and the window 14 are secured to the supporting member 28 by means of adhesives 42, 44, respectively.

A molding member 46 is securely disposed and supported on the outer surface of the supporting member 28 in such a manner that the curled end portions or projections 46a, 46b formed at the end edge thereof are securely received at the cutout portions 36 and 40, respectively.

In assembling the molding assembly 10 of FIG. 4, the adhesive 20 is at first applied on the surface of the window 14 or of the wall surface of backdoor 16 along the peripheral edge of the windshield 14, maintaining a space between the windshield 14 and the flange portion 16a of the backdoor to insert the central plate portion 32 into the space. After the supporting member 28 is supplied at its inner surfaces with the adhesive 42 and 44, it is installed in a manner that the flange portion 16a of the backdoor 16 is put between the first side plate portion 34 and the central plate portion 32 and the edge portion 14a of the windshield is put between the second side plate portion 38 and the central plate portion 32. It is to be noted that the central plate portion 32 serves as a spacer or a space maintaining member for maintaining a space between the backdoor 16 and the window 14. After a certain number of supporting members 28 are installed to their positions, the molding member 46 is mounted on the supporting members 28 in a manner to cover the outer surface of the supporting member 28 by securely putting the curled end portions 46a, 46b of the molding member 46 into the cutout portions 36 and 40, respectively. As a result, both the end edges of the flange portion 16a of the backdoor and of the window 14 can be covered with the molding member 46. Additionally, the adhesive 20 bonding the windshield 14 to the backdoor 16 can be concealed. Therefore, the molding assembly according to the present invention is improved both in its appearance and quality.

While the embodiment using the supporting member which is previously formed generally in E-shape has been shown and described with reference to FIGS. 3 and 4, hereinafter discussed with reference to FIGS. 5 to 14 are other embodiments according to the present invention which use other types of the supporting members which are not previously formed into E-shape but are finally formed into the same shape. In FIGS. 5 to 14, the same reference numerals as in FIGS. 3 and 4 denotes the corresponding parts.

Figure 5:
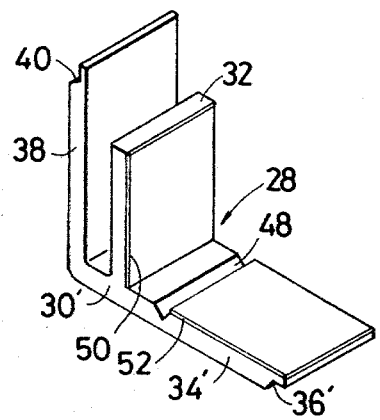
FIG. 5 is a perspective view of a supporting member forming part of a second preferred embodiment of a molding assembly in accordance with the present invention.
Figure 6:
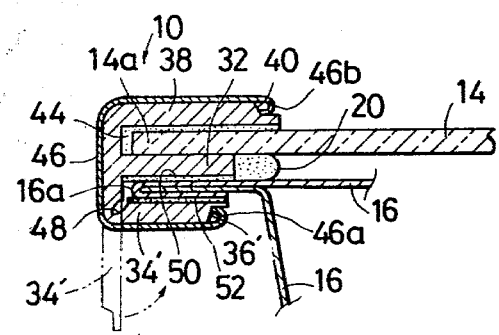
FIG. 6 is a cross-sectional view showing the assembled state of the molding assembly using the supporting member of FIG. 5.

FIGS. 5 and 6 illustrate a second preferred embodiment of the molding assembly 10 according to the present invention, which is similar to the embodiment shown in FIGS. 3 and 4 except for the construction of the supporting member 28. As clearly shown in FIG. 5, the supporting member 28 is originally formed generally into F-shape, in which the base plate portion 30' in this embodiment is formed considerably longer than that in FIG. 3. The central plate portion 32 and the second side plate portion 38 are formed similarly to those in FIG. 3. As seen, the surface of the base plate portion 30' is provided with an elongated straight groove 48 which is parallel to and spaced apart a certain distance from the central plate portion 32. It is to be noted that when the long base plate portion 30' is bent at the groove 48, the portion 34' will function the same as the first side plate portion 34 in FIG. 3 and accordingly the portion 34' is referred to as the first side plate portion hereinafter. The reference numerals 50 and 52 indicate layers of adhesive formed on a surface of the central plate portion 32 and on a surface of the first side portion 34', respectively. Each adhesive layer 50 or 52 may be formed by coating with a fluid adhesive or by putting a sheet adhesive on the surface of the central plate portion 32 or the surface of the first side plate portion 34'. While the first side plate portion 34' has been shown and described as being formed by bending the long base plate portion 30', it will be understood that the second side plate portion 38 may also be formed in the similar manner in which the second side plate portion 38 is formed by bending the long base plate portion at a groove formed on the surface of the base plate portion, though not shown.

In assembling the molding assembly 10 of FIG. 6, the supporting member 28 in the state shown in FIG. 5 is installed so that the edge portion 14a of the window is put between the central plate portion 32 and the second side plate portion 38 and the central plate portion 32 is put between the window 14 and the flange portion 16a of the backdoor 16, after the adhesive 44 is applied to the opposite surfaces of the central plate portion 32 and the second side plate portion 38. The first side plate portion 34' is kept in a position indicated in phantom in FIG. 6. The first side plate portion 34' is then bent in a direction indicated by an arrow in FIG. 6 to put the portion 34' at a location shown by solid lines in FIG. 6. Accordingly, the first side plate portion 34' is secured to the flange portion 16a of the backdoor body 16 by means of the adhesive layer 52. Of course, the central plate portion 32 is also bonded to the flange portion 16a by means of the adhesive layer 50. After a certain number of the supporting members 28 are installed at their positions, the molding member 46 is installed to cover the outer surfaces of the supporting members by securely putting the curled ends thereof at the cutout portions 36' and 40 of the first and second side plate portions 34', 38, respectively.

FIGS. 7 to 11 illustrate a third preferred embodiment of the molding assembly 10 in accordance with the present invention, which is similar to the embodiment of FIGS. 5 and 6 with the exception that the second side plate portion is also formed by bending the considerably long base plate portion 30' so that a portion 38' of the base plate portion 30' becomes parallel with the central plate portion 32. Accordingly, the portion 38' is referred to as the second side plate portion hereinafter.

A layer 56 of an adhesive is formed on a surface of the second side plate portion 38' which surface will be opposite to the central plate portion 32. The adhesive layer 56 may be formed by applying a fluid adhesive or by putting a sheet adhesive on the surface of the second side plate portion 38'. While an adhesive layer on the second side surface 32b has been omitted from the drawing, such an adhesive material layer may be used if necessary.

Figure 7:
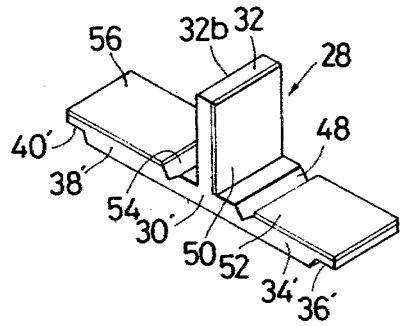
FIG. 7 is a perspective view of a supporting member forming part of a third preferred embodiment of a molding assembly in accordance with the present invention.
Figure 8:
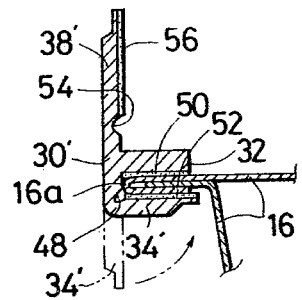
FIGS. 8 to 11 are cross-sectional views showing the assembling process and the assembled state of the molding assembly using the supporting member of FIG. 7.
Figure 9:
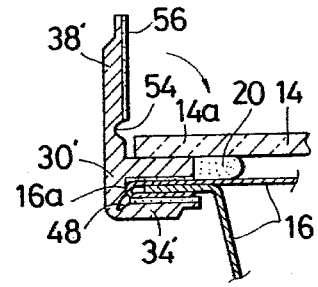
Figure 11:
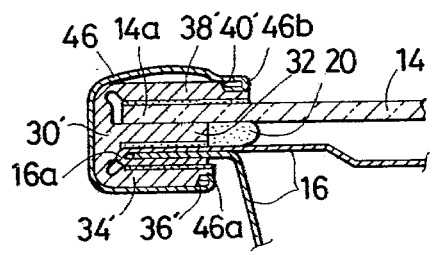
Figure 10:
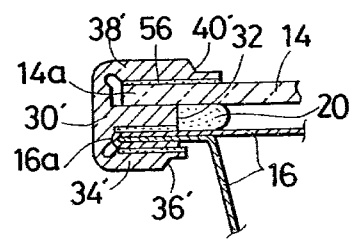

In assembling the molding assembly 10 of FIG. 11, the supporting member 28 in the state shown in FIG. 7 is securely installed on the flange portion 16a of the backdoor 16 by bonding the central plate portion 32 to the flange portion 16a by means of the adhesive layer 50 as shown in FIG. 8. Then, the first side plate portion 34' is bent in a direction of an arrow from a position indicated in phantom toward a position indicated by solid lines so as to bond the first side plate portion 34' to the flange portion 16a of the backdoor 16 as shown in FIG. 8. It will be understood that a certain number of the supporting members 28 are securely installed on the flange portion 16a of the backdoor in a manner described before. Thereafter, the window 14 is put on the central plate portion 32 to be bonded to the backdoor 16 by means of the adhesive 20 and then the second side plate portion 38' is bent in a direction of an arrow as shown in FIG. 9. The second side plate portion 38' is then bonded to a surface of the window 14 as shown in FIG. 10. While the supporting member 28 has been explained to be firstly installed on the flange portion 16a of the backdoor 16, the supporting member 28 may be installed first on the edge portion 14a of the window 14. The molding member 46 is thereafter mounted to cover the outer surface of the supporting member 28 putting the curled portions 46a and 46b of the molding member 46 at the cutout portions 36' and 40' of the first and second side plate portions 34' and 38', respectively, as shown in FIG. 11.

Figure 12:
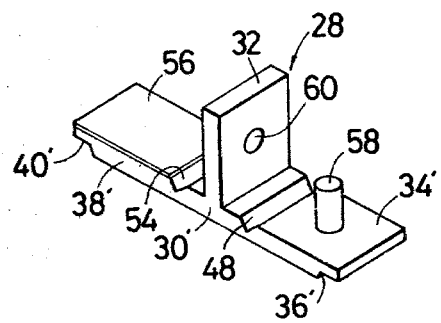
FIG. 12 is a perspective view of a supporting member forming part of a fourth preferred embodiment of a molding assembly in accordance with the present invention.
Figure 13:
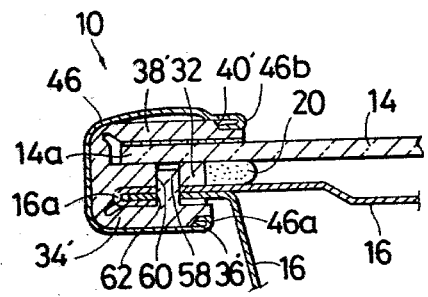
FIG. 13 is a cross-sectional view showing the assembled state of the molding assembly using the supporting member of FIG. 12.

FIGS. 12 and 13 illustrate a fourth preferred embodiment of the molding assembly in accordance with the present invention, which is similar to the embodiment shown in FIGS. 7 to 11 with the exception that the first side plate portion 34' is provided with a projection 58 which is arranged to be insertable into an opening 60 formed through the central plate portion 32. In this embodiment, the projection 58 is cylindrical and formed perpendicularly relative to the surface of the first side plate portion 34' at the central portion of the surface of the first side plate portion 34'. Accordingly, the opening 60 is also cylindrical and formed perpendicularly relative to the surface of the central plate portion 32 at the central portion of the central plate portion 32.

In assembling the molding assembly 10 of FIG. 13, the projection 58 is at first inserted into an opening 62 formed through the flange portion 16a of the backdoor 16 and then inserted into the opening 60 of the central plate portion 32. It will be understood that a certain number of the openings 62 are formed through the flange portion 16a to install a certain number of the supporting members 28 on the flange portion 16a. Thereafter, the window 14 is mounted on the flange portion 16a of the backdoor 16 through the central plate portion 32, and is bonded to the surface of the flange portion 16a by means of the adhesive 20. Then, the base plate portion 30' is bent at the groove 54 so as to cause the second side plate portion 38' to contact with the surface of the window 14, bonding the second side plate portion to the windshield by means of the adhesive layer 56. Lastly, the molding member 46 is securely mounted on the outer surface of the supporting member 28 by putting the curled end portions 46a, 46b into the cutout portions 36' and 40' of the first and second side plate portions 34', 38' respectively.

It is to be noted that, by virtue of the projection 58 of the first side plate portion 34' and the corresponding opening 60 of the central plate portion 32, adhesive layers on the surfaces of the first side plate portion 34' and of the central plate portion 32 have been able to be omitted and therefore operation efficiency during manufacturing can be improved.

Figure 14:
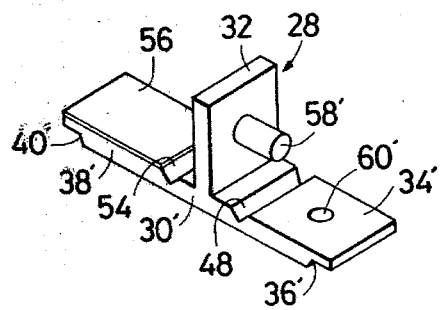
FIG. 14 is a perspective view showing a modification of the supporting member of FIG. 12.

Although the projection 58 and the corresponding opening 60 have been shown and described as being formed on the first side plate portion 34' and on the central plate portion 32, respectively, with reference to FIGS. 12 and 13, it is possible to form the projection 58 and the corresponding opening 60 on the central plate portion 32 and the first plate portion 34', respectively, as shown in FIG. 14.

While the grooves 48 and 54 have been shown and described as being formed on the surface of base plate portion 30' at which surface the central plate portion 32 is integrally formed, the grooves 48 and 54 may be formed on the opposite surface of the base plate portion 30'.

It will be understood that the molding assembly according to the present invention may be utilized for covering edge portions of other devices than the backdoor of the motor vehicle. What is claimed is:

1. A molding assembly for covering the edge portions of first and second structural members which are secured to each other while maintaining a space therebetween, comprising:

a supporting member including a base plate portion, a central plate portion integral with said base plate portion having first and second side surfaces, a first side plate portion integral with said base plate portion and located opposite the first side surface of said central plate portion with a first space between said first side plate portion and the first side surface of said central plate portion, the first structural member being disposable in said first space, a second side plate portion integral with said base plate portion and located opposite the second side surface of said central plate portion with a second space between said second side plate position and said central plate portion, the second structural member being disposable in said second space;

a projection formed on the surface of said first side plate portion substantially perpendicular thereto, said projection being insertable into an opening formed in the central plate portion through an opening formed through the first structural member; and a molding member which is securely supported on the surface of said supporting member.

2. A molding assembly for covering the edge portions of first and second structural members which are secured to each other while maintaining a space therebetween, comprising:

a supporting member including a base plate portion, a central plate portion integral with said base plate portion having first and second side surfaces, a first side plate portion integral with said base plate portion and located opposite the first side surface of said central plate portion with a first space between said first side plate portion and the first side surface of said central plate portion, the first structural member being disposable in the first space, a second side plate portion integral with said base plate portion and located opposite the second side surface of said central plate portion with a second space between said second side plate portion and said central plate portion, the second structural member being disposable in the second space;

a projection formed on the first side surface of said central plate portion substantially perpendicular thereto, said projection being insertable into an opening formed in said first side plate portion through an opening formed through the first structural member; and a molding member which is securely supported on the surface of said supporting member.

3. A molding assembly as claimed in claim 1 or 2, in which said first side plate portion is formed by firstly forming a groove on the surface of said base plate portion spaced apart from said central plate portion, and secondly, bending said base plate portion at said groove to hold the first structural member between the bent end portion of said base plate portion and said central plate portion.

4. A molding assembly as claimed in claim 1 or 2, in which said second side plate portion is formed by firstly forming a groove on the surface of said base plate portion, spaced apart from said central plate portion, and secondly, bending said base plate portion at said groove to hold the second structural member between the bent end portion of said base plate portion and said central plate portion.

5. A molding assembly as claimed in claim 1 or 2, in which the first structural member is a flange portion of a backdoor of a motor vehicle, and the second structural member is a window of the backdoor.

6. A molding assembly as claimed in claim 1 or 2, in which the first structural member is a window of a backdoor of a motor vehicle, and the second structural member is a flange portion of the backdoor.

7. A molding assembly as claimed in claim 1 or 2, in which said first and second side plate portions are respectively formed at their end edge portions with cutout portions which securely receive projections formed on said molding member.

8. A molding assembly as claimed in claim 5, in which the flange portion of the backdoor is substantially parallel with the edge portion of the window.

9. A molding assembly as claimed in claim 8, in which said central plate portion, said first side plate portion and said second side plate portion of said supporting member are substantially parallel with each other.

10. A molding assembly as claimed in claim 9, in which said molding member is contactable with said first side plate portion, said base plate portion and said second side plate portion of said supporting member.

11. A molding assembly as claimed in claim 10, in which said molding member is formed at its end edge portions with elongated projections.

12. A molding assembly as claimed in claim 11, in which said first and second side plate portions are formed at their end edge portions with two elongated cutout portions, respectively, which receive said elongated projections of said molding member.

13. A molding assembly as claimed in claim 12, in which each elongated projection is parallel with the surface of said base plate portion.

14. A molding assembly as claimed in claim 13, in which each elongated cutout portion is parallel with the surface of said base plate ortion.

* * * * *